United States Patent
Kunkel

(10) Patent No.: US 10,539,203 B2
(45) Date of Patent: Jan. 21, 2020

(54) REPLACEMENT INDICATOR FOR A SHOCK ABSORBER

(71) Applicant: Tenneco Automotive Operating Company Inc., Lake Forest, IL (US)

(72) Inventor: Brian Kunkel, Grass Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/274,698

(22) Filed: Feb. 13, 2019

(65) Prior Publication Data

US 2019/0178327 A1    Jun. 13, 2019

(51) Int. Cl.
| | |
|---|---|
| *G01K 5/28* | (2006.01) |
| *G01K 5/32* | (2006.01) |
| *G01L 19/10* | (2006.01) |
| *G01L 19/12* | (2006.01) |
| *B66C 1/40* | (2006.01) |
| *B01D 29/15* | (2006.01) |
| *H01H 9/16* | (2006.01) |
| *F16F 9/32* | (2006.01) |
| *G07C 5/00* | (2006.01) |

(52) U.S. Cl.
CPC ............ *F16F 9/3264* (2013.01); *G07C 5/006* (2013.01); *B60G 2600/042* (2013.01)

(58) Field of Classification Search
CPC .................................................... F16F 9/3264
See application file for complete search history.

(56) References Cited

U.S. PATENT DOCUMENTS

| | | | |
|---|---|---|---|
| 4,458,234 A | | 7/1984 | Brisard |
| 5,525,960 A | | 6/1996 | McCall et al. |
| 5,924,528 A | * | 7/1999 | Vermolen ................. F16F 9/46 188/266.1 |
| 6,278,361 B1 | | 8/2001 | Magiawala et al. |
| 7,941,255 B2 | | 5/2011 | Wimmer et al. |
| 7,941,256 B2 | | 5/2011 | Namuduri et al. |
| 9,552,679 B2 | * | 1/2017 | Rutkowski ............. G07C 5/006 |
| 2007/0034464 A1 | * | 2/2007 | Barefoot ................... F16F 9/34 188/322.15 |
| 2013/0161138 A1 | * | 6/2013 | Barefoot ................... F16F 9/34 188/282.1 |

FOREIGN PATENT DOCUMENTS

| | | |
|---|---|---|
| DE | 2533626 | 2/1977 |
| DE | 102006021937 | 5/2008 |
| GB | 2315051 | 9/2000 |
| WO | 2009089600 | 7/2009 |

* cited by examiner

*Primary Examiner* — Joseph H Feild
*Assistant Examiner* — Pameshanand Mahase
(74) *Attorney, Agent, or Firm* — McGarry Bair PC

(57) ABSTRACT

A replacement indicator for a shock absorber includes a pressure sensor which monitors pressure of operating fluid inside the shock absorber. The replacement indicator includes an indicative mechanism operatively coupled with the pressure sensor. The indicative mechanism includes an indicator component coupled to the shock absorber. The indicator component gets displaced relative to an outer surface of the shock absorber when the pressure of the operating fluid drops below a threshold pressure.

11 Claims, 4 Drawing Sheets

REPLACEMENT INDICATOR FOR A SHOCK ABSORBER

TECHNICAL FIELD

The present disclosure relates to a shock absorber. More particularly, the present disclosure relates to a replacement indicator for the shock absorber.

BACKGROUND

Vehicles generally include shock absorbers that are used in conjunction with suspension systems to absorb unwanted vibrations which occur while driving the vehicle. In order to absorb the vibrations, shock absorbers are generally connected between a body of the vehicle and the suspension system. Over a period of time, shock absorbers can lose their effectiveness, thereby impacting their damping characteristics. For example, when a damping force of the shock absorber reduces, a motion of the vehicle changes towards an undamped or vibratory motion. This undamped motion may cause damage to the suspension system, tires, and may also cause discomfort to a person seated in the vehicle.

When shock absorbers wear out or operate in a defective manner, it is advisable to either replace them with a new shock absorber or service them for improved vehicle performance. However, it is also vital to know when the shock absorber has developed a fault severe enough so that an intervention from service or maintenance personnel is required for repair and/or replacement accordingly.

Given description covers one or more above mentioned problems and discloses a system to solve the problems.

SUMMARY

In an embodiment of the present disclosure, a replacement indicator for a shock absorber is provided. The replacement indicator includes a pressure sensor which monitors pressure of operating fluid inside the shock absorber. The replacement indicator further includes an indicative mechanism operatively coupled with the pressure sensor. The indicative mechanism includes an indicator component coupled to the shock absorber. The indicator component gets displaced relative to an outer surface of the shock absorber when the pressure of the operating fluid drops below a threshold pressure.

Other features and aspects of this disclosure will be apparent from the following description and the accompanying drawings.

DETAILED DESCRIPTION

Figure 1:
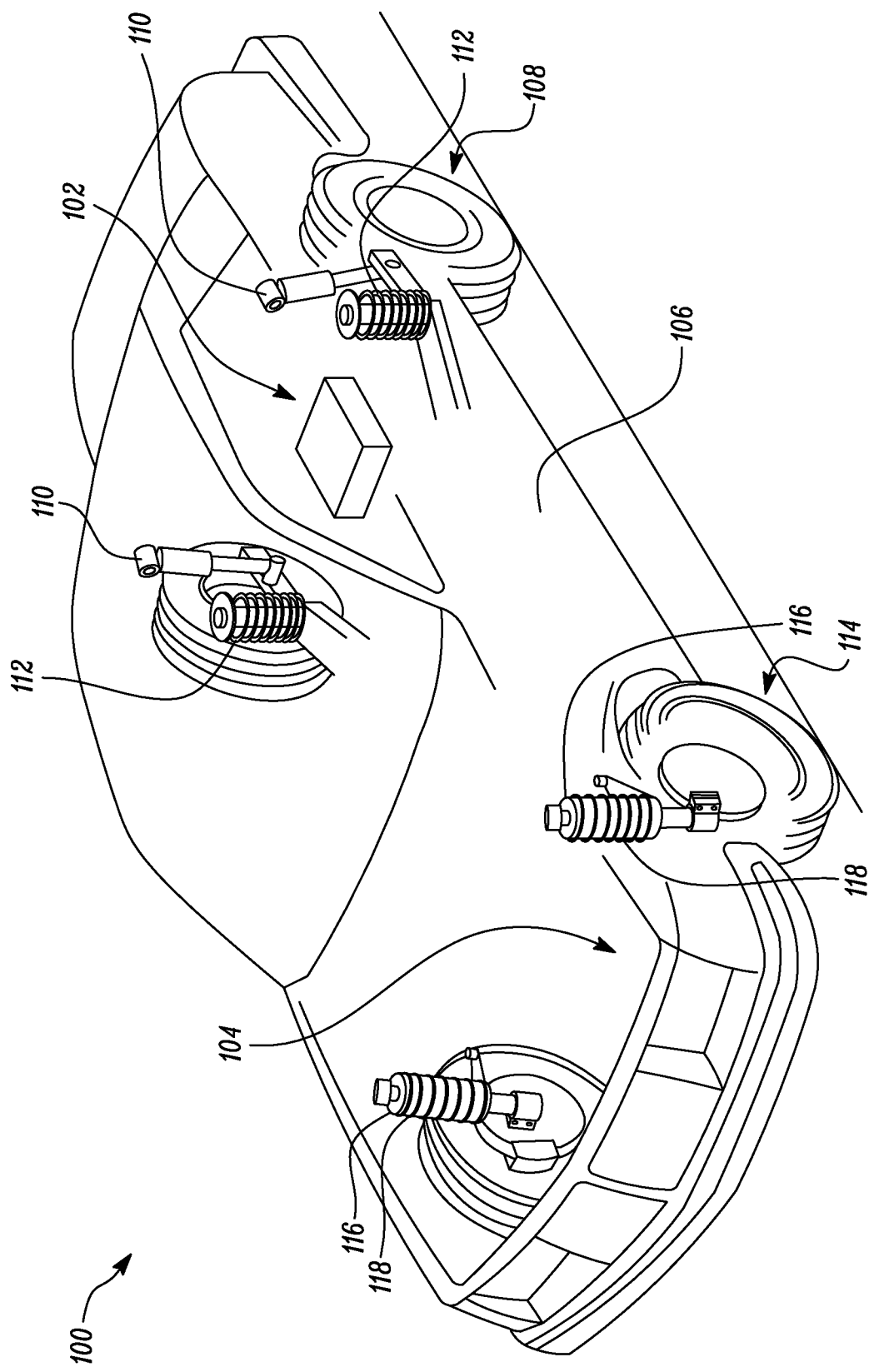
FIG. 1 is an exemplary representation of a vehicle, according to an aspect of the present disclosure.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1, a vehicle 100. The vehicle 100 includes a rear suspension 102, a front suspension 104 and a body 106. The rear suspension 102 includes a rear axle assembly (not shown) adapted to operatively support a pair of rear wheels 108. The rear axle assembly is operatively connected to the body 106 by means of a pair of rear shock absorbers 110 and a pair of rear helical coil springs 112. Similarly, the front suspension 104 includes a front axle assembly (not shown) adapted to operatively support a pair of front wheels 114. The front axle assembly is operatively connected to the body 106 by a pair of front shock absorbers 116 and by a pair of front helical coil springs 118.

The rear shock absorbers 110 and the front shock absorbers 116 serve to dampen relative motion of unsprung portion (i.e., front and rear suspensions 102, 104 respectively) from sprung portion (i.e., the body 106) of the vehicle 100. It should be contemplated that the rear shock absorbers 110 and the front shock absorbers 116 are substantially identical in structural and functional features. However, there may be slight variations based on deployment of the shock absorber at a particular location (front or rear) on the vehicle 100. While the vehicle 100 has been depicted as a passenger car having front and rear axle assemblies, dampers may be used with other types of vehicles or in other types of applications including, but not limited to, vehicles incorporating independent or non-independent front and rear suspension assemblies. For the purpose of explanation of the present disclosure, the rear shock absorbers 110 and the front shock absorbers 116 will be referred to as shock absorbers in the forthcoming description.

Figure 2B:
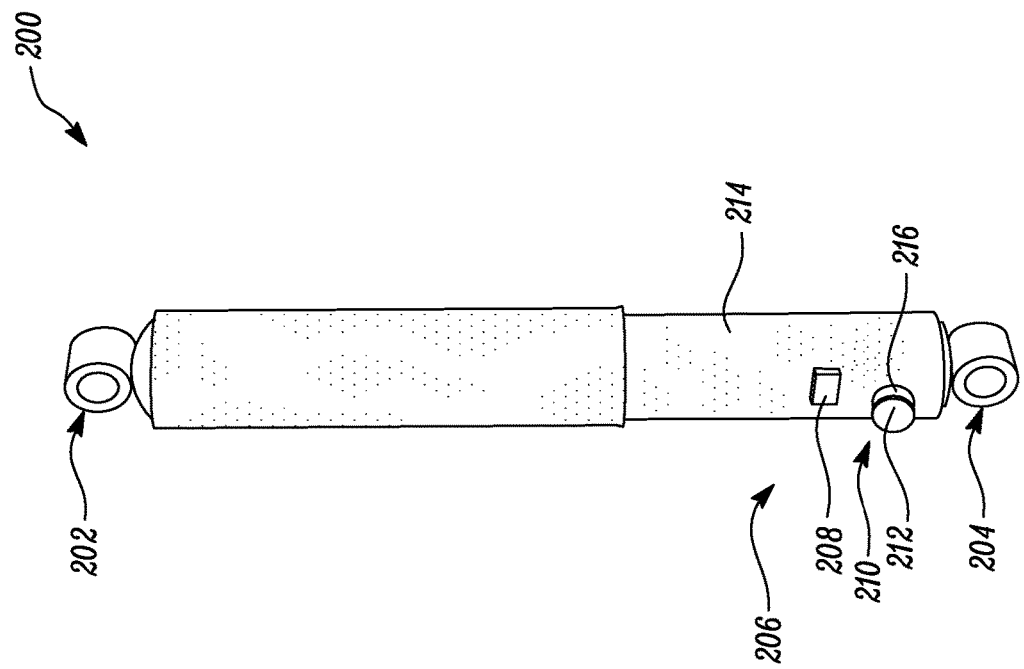
FIGS. 2A & 2B show the shock absorber having a replacement indicator, according to an aspect of the present disclosure.
Figure 2A:
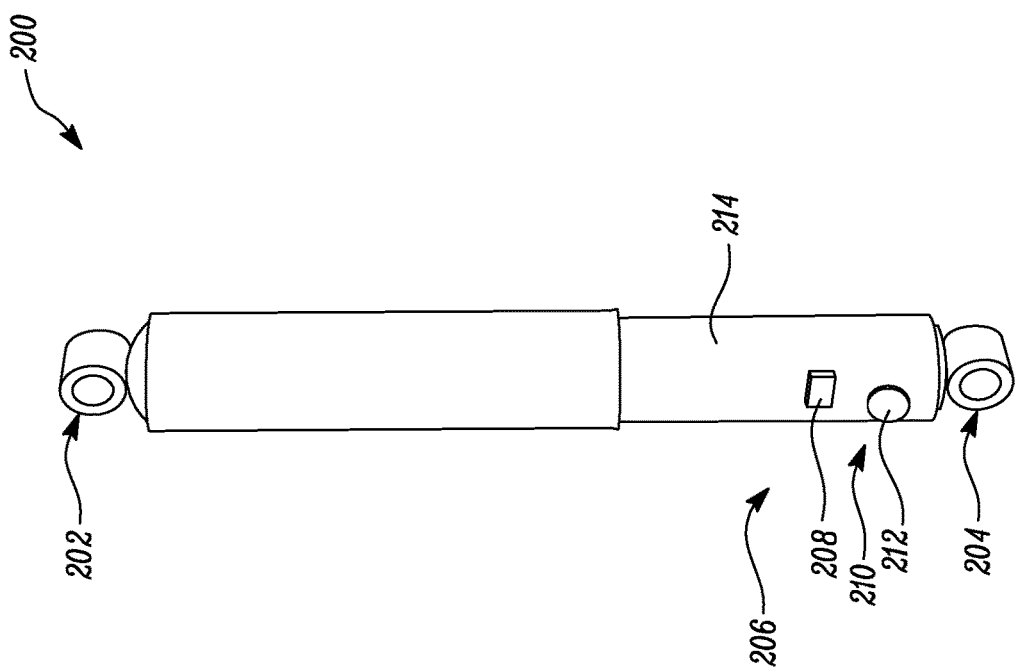

FIG. 2A illustrates a shock absorber 200 according to an embodiment of the present disclosure. The shock absorber 200 has a head end 202 and a rod end 204. The shock absorber 200 may be suitably coupled to the vehicle 100 through the head and rod ends 202, 204. The shock absorber 200 may include an inner tube (not shown) and an outer tube. The inner tube may define an inner chamber such that a piston (not shown) may slide inside the inner tube. An operating fluid (not shown) may be selectively compressed through sliding motion of the piston within the inner chamber resulting in a dampening effect. In an embodiment, the operating fluid is a gas. An outer chamber may be defined between the inner tube and the outer tube. The outer chamber may also store the operating fluid as a reservoir and may selectively supply or receive the operating fluid from the inner chamber. A valve assembly may fluidly couple the inner chamber and the outer chamber.

The shock absorber 200 includes a replacement indicator 206. The replacement indicator 206 provides information about whether the shock absorber 200 is not functioning appropriately and needs to be replaced. The replacement indicator 206 may also provide information about service or maintenance requirements of the shock absorber 200.

The replacement indicator 206 includes a pressure sensor 208. The pressure sensor 208 monitors pressure of the operating fluid inside the shock absorber 200. The pressure sensor 208 may be any suitable type of pressure sensor which may be applicable with various aspects of the present disclosure. One example of a suitable pressure sensor is a passive pressure sensor that includes static seals, springs or other mechanical components. Another example of a suitable pressure sensor is an electronic pressure sensor. In an embodiment, the operating fluid is a gas, and the pressure sensor 208 monitors a gas pressure. The pressure sensor 208 may be coupled to the shock absorber 200 towards the head end 202 or the rod end 204. In the illustrated embodiment, the pressure sensor 208 is coupled to the shock absorber 200 towards the head end 202.

In an embodiment, the pressure sensor 208 is a mechanical pressure sensor. The replacement indicator 206 further includes an indicative mechanism 210. The indicative mechanism 210 is operatively coupled with the pressure sensor 208. The indicative mechanism 210 indicates whether the shock absorber 200 needs to be replaced.

The indicative mechanism 210 includes an indicator component 212 coupled to the shock absorber 200. The indicator component 212 is coupled to the shock absorber 200 such that the indicator component 212 may get displaced relative to the shock absorber 200. The indicator component 212 may get displaced relative to an outer surface 214 of the shock absorber 200.

FIG. 2A illustrates the shock absorber 200 in a healthy operational state. The indicator component 212 is coupled to the shock absorber 200 in a position corresponding to the healthy operational state of the shock absorber 200. The indicative mechanism 210 may be coupled to the shock absorber 200 at any suitable location. The indicative mechanism 210 is illustrated to be coupled near the rod end 204 of the shock absorber 200. In an embodiment, the indicative mechanism 210 may be coupled to the shock absorber 200 near the head end 202. The present disclosure is not limited by a coupling location of the indicative mechanism 210 on the shock absorber 200.

In the illustrated embodiment, both the pressure sensor 208 and the indicative mechanism 210 are coupled to the shock absorber 200 towards the rod end 204. In another embodiment, both the pressure sensor 208 and the indicative mechanism 210 may be coupled to the shock absorber 200 towards the head end 202.

FIG. 2B shows the shock absorber 200 in a worn-out state. In such an operational state, the replacement indicator 206 shall provide visual indication of replacement need of the shock absorber 200. Pressure of the operating fluid of the shock absorber 200 may drop below a threshold pressure in such a situation. The threshold pressure may be defined based on various parameters such as an application area for which the shock absorber 200 is being used, size of the shock absorber 200, material of the shock absorber 200 etc. The threshold pressure is defined as a minimum operating pressure required for functioning of the shock absorber 200. When the pressure of the operating fluid drops below the threshold pressure, the indicator component 212 gets displaced relative to the outer surface 214 of the shock absorber 200. In an embodiment, the indicator component 212 getting displaced relative to the outer surface 214 of the shock absorber 200 indicates that the shock absorber 200 should be inspected. In another embodiment, the indicator component 212 getting displaced relative to the outer surface 214 of the shock absorber 200 indicates that the shock absorber 200 should be replaced.

The indicator component 212 is shown as displaced relative to the outer surface 214 of the shock absorber 200 in FIG. 2B. In the illustrated embodiment, the indicator component 212 extends away from the outer surface 214 of the shock absorber 200. More specifically, the indicator component 212 may pop out relative to the outer surface 214 of the shock absorber 200. The indicator component 212 has an indicator surface 216 which is visible after the indicator component 212 gets displaced relative to the outer surface 214. The indicator surface 216 may be applied with a bright colored layer of paint of coating etc. which may make the indicator surface 216 clearly visible for a user. In an embodiment, the indicator surface 216 is of red color. This allows the indicator surface 216 to act as a visual clue for replacement of the shock absorber 200.

The indicator component 212 may get displaced relative to the outer surface 214 in any other manner as well. In one embodiment, the indicator component 212 may get displaced towards inside of the shock absorber 200. A hole or a groove (not shown) may be provided which may have bright colored inner walls. Such inner walls may get visible after the indicator component 212 moves inside the hole or the groove. In one embodiment, the indicator component 212 may slide along the outer surface 214 while getting displaced. Such displacement may uncover a bright colored patch or surface which may act as the visual clue for replacement of the shock absorber 200.

Figure 3:
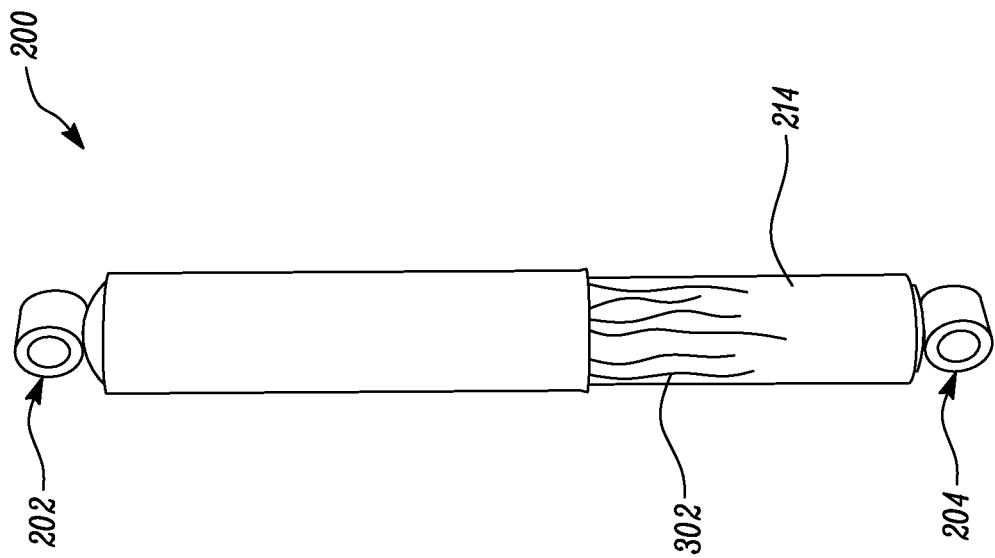
FIG. 3 shows the shock absorber having visual indication for operating fluid leakage, according to an aspect of the present disclosure.

FIG. 3 shows another embodiment of a visual indication. In case of leakage of the operating fluid from the shock absorber 200, the outer surface 214 may change color where leaked operating fluid comes in contact with the outer surface 214. The outer surface 214 may be applied with a paint or a coating or any other such material which may exhibit such properties. The present disclosure is not limited by any such material in any manner. Changed color of the outer surface 214 may act as a visual aid for a user. Curved lines 302 depict changed color of the outer surface 214. The user may be prompted for checking status of the shock absorber 200 and take appropriate corrective measures.

Figure 4:
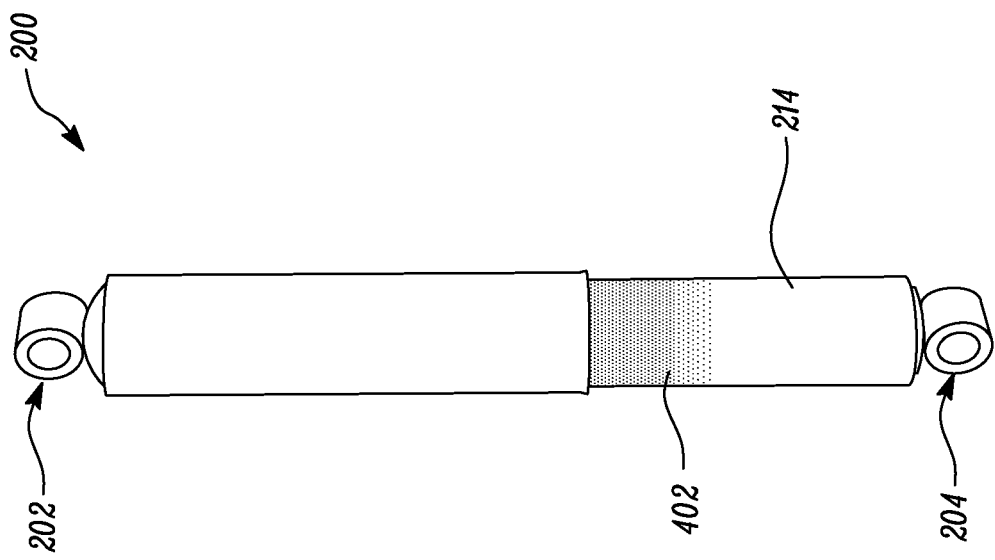
FIG. 4 shows the shock absorber having visual indication for wearing out, according to an aspect of the present disclosure.

FIG. 4 illustrates another embodiment of the visual indication aspect of the present disclosure. The outer surface 214 of the shock absorber 200 may increasingly change color or texture as life of the shock absorber 200 progresses. A shaded region 402 depicts colored outer surface. Extent of the colored region along the outer surface 214 may indicate life of the shock absorber 200. Various other examples may be envisioned for visually indicating wear, failure or any other such event related to the shock absorber.

Such visual aids inform users about operational state of the shock absorber 200 and save effort in terms of cost as well as downtime by allowing the user to take corrective actions appropriately. The present disclosure provides a convenient and effective replacement indicator for the shock absorber 200.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A replacement indicator for a shock absorber comprising:
    a pressure sensor configured to monitor pressure of operating fluid inside the shock absorber; and
    an indicative mechanism operatively coupled with the pressure sensor, wherein the indicative mechanism includes an indicator component coupled to the shock absorber, wherein the indicator component gets displaced relative to an outer surface of the shock absorber when the pressure of the operating fluid drops below a threshold pressure.

2. The replacement indicator of claim 1, wherein the indicator component getting displaced relative to the outer surface of the shock absorber indicates replacement requirement of the shock absorber.

3. The replacement indicator of claim 1, wherein the threshold pressure is defined as a minimum operating pressure required for functioning of the shock absorber.

4. The replacement indicator of claim 1, wherein the pressure sensor is mechanical pressure sensor.

5. The replacement indicator of claim 1, wherein the indicator component getting displaced relative to the outer surface of the shock absorber indicates that the shock absorber should be inspected.

6. The replacement indicator of claim 1, wherein the indicator component getting displaced relative to the outer surface of the shock absorber indicates that the shock absorber should be replaced.

7. The replacement indicator of claim 1, wherein the operating fluid is a gas, and the pressure sensor monitors a gas pressure.

8. The replacement indicator of claim 1, wherein the shock absorber has a head end and a rod end, and the pressure sensor is disposed towards the head end.

9. The replacement indicator of claim 8, wherein the indicative mechanism is disposed towards the head end.

10. The replacement indicator of claim 1, wherein the shock absorber has a head end and a rod end, and the pressure sensor is disposed towards the rod end.

11. The replacement indicator of claim 10, wherein the indicative mechanism is disposed towards the rod end.

* * * * *